June 12, 1962 C. H. SCHAAR 3,038,198
APPARATUS FOR PERFORATING THERMOPLASTIC SHEETS
Filed March 10, 1960
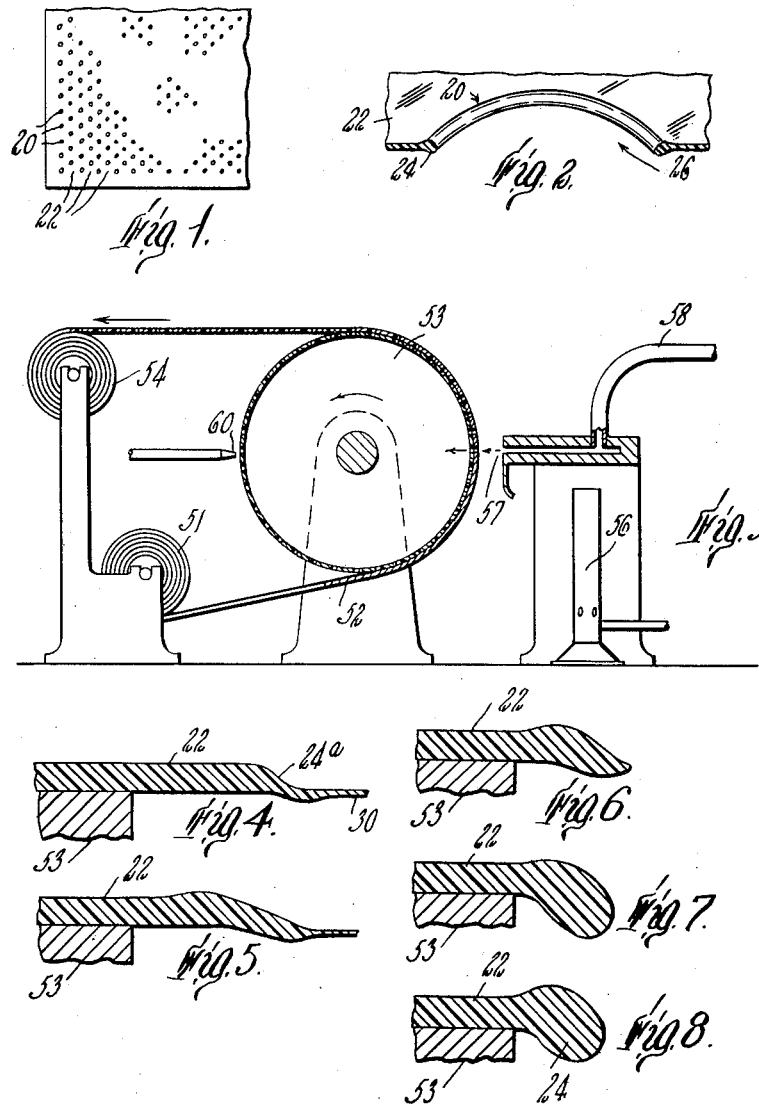
INVENTOR.
Charles H. Schaar
Rowland V. Patrick
BY

United States Patent Office 3,038,198
Patented June 12, 1962

3,038,198
APPARATUS FOR PERFORATING
THERMOPLASTIC SHEETS
Charles H. Schaar, Chicago, Ill., assignor to The Kendall Company, Boston, Mass., a corporation of Massachusetts
Filed Mar. 10, 1960, Ser. No. 14,143
3 Claims. (Cl. 18—1)

This invention relates to apparatus for the treatment of thermoplastic sheets whereby they are selectively melted to provide holes or perforations in any desired number, size or arrangement.

Specifically this invention is concerned with apparatus for the treatment of thermoplastic sheets in such manner as to melt holes or perforations in selected areas of the total surface subjected to the overall application of hot fluid, particularly hot gas.

The primary object of the invention is the provision of apparatus for treating thermoplastic sheet material so as to continuously produce a strong perforated sheet economically and rapidly and with a minimum of machine maintenance.

The selection of the location of the perforations and their sizes may follow a large variety of patterns, highly useful patterns including those wherein the perforations are minute and only minutely separated from one another. In the production of sheets for use in surgical dressings, however, larger and more widely separated perforations may be desirable.

The perforations may also take a variety of geometric shapes, e.g. polygonal, circular, elliptical, and/or combinations thereof. They may be intermixed in sizes and in heterogeneous patterns for decorative or other purposes. The area surrounding each perforation usually takes the form of a peripheral beaded area surrounding the perforation.

The apparatus for making sheet materials in accordance with this invention may be more fully understood from the following description and the accompanying drawings, in which:

FIG. 1 is a plan view showing schematically a sheet material in which perforations were produced by the process using the apparatus of the invention; and FIG. 2 is a highly enlarged detailed cross-sectional schematic perspective view of a portion of the sheet shown in FIG. 1; and FIG. 3 is a diagrammatic representation of one form of the apparatus of the inventon useful in making the sheet material of FIG. 2; and FIGS. 4–8 are greatly enlarged cross-sectional depictions showing progressive formation of a beaded perforation by the apparatus of this invention.

FIG. 1 represents a thermoplastic sheet treated on the apparatus of this invention, the entire surface area of which displays a series of perforations 26, each surrounded by an area 20 which may have different physical characteristics from those of the intervening areas 22 constituting the matrix of the sheet. In the form of the invention shown by the detail in FIG. 2, each of these areas surrounding perforations is toroidal in shape and somewhat thicker than the matrix and has the appearance of an annular bead 24 encircling a perforation 26 through the sheet.

These beads 24 serve the purpose of reinforcing the edges of the perforations. In their reinforcing function, they may be aptly regarded as grommets.

The perforations may be extremely minute. For example, the film of FIGS. 1 and 2, having, for example a ¼ mil caliper in the areas 22 may contain perforations slightly less than 20 mils in minimum diameter, and so closely spaced as to provide 714 holes or more per square inch. This example is by no means the ultimate, however, since in very small samples as many as 4,000 holes per square inch of 8 mils diameter each have been made and on an individual basis, holes as fine as 2 mils have been produced.

Normally, the beads 24 and 24a are constituted wholly or in some part of material displaced into the bead from an area within the bead. Accordingly, the larger the perforation, the larger the volume of the bead.

It can be seen that, as an extreme, the portion of the sheet within the bead areas may constitute substantially the entire surface area of the sheet, particularly if the perforations and/or their surrounding beaded areas are, for example, of hexagonal or other suitable equilateral shape so as to interfit with every adjacent beaded area. For optimum mechanical properties, it is much preferred to leave a continuous surface matrix 22 between the beaded areas.

Perforations in the treated area have definite commercial advantage in that the sheet is rendered more permeable and may have desirable perforation patterns or design patterns, without substantial loss in major portions of the sheet of the original stability and integrity. These qualities are retained by the continuous matrix, along with the other qualities of the original sheet. In this connection, the formation of a bead is of decided advantage in providing reinforcing areas about the apertured structure, thus increasing the tear resistance of the sheet, even when compared to the tear resistance of the unmodified film.

Using the methods and apparatus of this invention one may perforate other thermoplastic sheets of such diverse materials as polytrimethylene terephthalate, polyethylene 4,4'-diphenyldicarboxylate, polytetramethylene 4,4'-diphenyldicarboxylate, polyethylene 4,4'-diphenylmethane dicarboxylate, polyethylene 1,5-naphthalate, polyethylene 2,6-naphthalate, polyvinyl fluoride, polyvinyl methyl ether, polymers and copolymers of vinylidene chloride, vinylidene bromide, vinylidene chlorobromide, vinylidene cyanide, vinylidene halocyanides, chlorotrifluoroethylene polymers, N-substituted polyamides of the type of N-methylated polydecamethylene adipamide, hexamethylene sebacamide sold commercially as "Nylon 610" by E. I. du Pont de Nemours and Company, isotactic polystyrene, isotactic poly alpha butylene, isotactic polypropylene, polyethylene, polyvinyl chloride, polyvinyl acetate and copolymers thereof, polystyrene, polyisobutylene, polyacrylonitrile, cellulose acetate, cellulose triacetate, cellulose acetatebutyrate, and ethyl cellulose.

In puncturing the film, the essential action is to melt the material within the selected areas. Precise localization of treatment may be obtained, at the points where perforations are desired, by transfer of heat from a heated fluid, preferably gaseous, while controlling the retention of heat from the fluid by the sheet so that areas chosen for perforation rise in temperature above the melting point of the material thereof, while the material in the intervening areas remains unmelted, being always at a temperature below the softening temperature of the material. Such control, in accordance with the process of this invention takes the form of more rapidly conducting the absorbed heat away from areas of the sheet other than those chosen for perforation, as by the use of a cooled grid over which the sheet is supported during the application of the heat. Such a grid may conveniently be a perforated, pitted, engraved or otherwise indented plate, cylinder or other suitable heat conductive body provided with an interrupted surface having, like a grid, a non-uniform surface so as to provide non-film contacting areas when the film is supported by the surface. For example, a circumferentially grooved cylinder or a fine screen may be used, or a fine screen or perforated cylindrical plate of the type used in the pulp industry for increasing the fiber concentration in fiber containing solutions.

Apparatus which may be successfully used in the perforation of sheets by the process of this invention is shown in FIG. 3 of the drawings. The apparatus includes a reel of film material 51 from which the material 52 is fed, usually in single layer form, over a rotating metal cylinder or drum 53, forming a base or support, the surface of which is provided with perforations, depressions or indentations of the desired dimension and pattern and the film 52 then passes to a take-up roll 54. Opposite the drum there is provided means in the form of a nozzle for directing a jet of heated air onto the surface of the film 52 passing over the drum 53. The jet is so formed that it may be efficiently heated as by a gas flame from a burner 56. The air is directed through the jet orifice 57 under pressure supplied through the pipe 58.

Operation of the apparatus shown in FIG. 3 may be varied according to the particular type of sheet used. In general, the temperature of the hot fluid should be such as to at least insure melting through of certain areas of the sheet during its passage through the fluid. The velocity of the jet and its temperature should be taken into consideration in connection with the speed of the sheet, the faster the jet velocity the lower the temperature for a given speed of film operation.

In the perforation of sheets by the process of this invention, air jet temperatures as low as the melting point of the material being treated may be used. However, jet temperatures in excess of the melting temperature of the film and from 260° C. to 875° C. with film speeds running from 4 to 33 yards per minute, depending upon the particular film, are preferred. The grid sizes used in the case of circular holes have varied from 2 mils to ¼ inch in diameter. Obviously the range can be extended.

In perforating ¼ mil Mylar polyester film having a published melting point temperature of about 250° to 255° C., the jet orifice was 25 mils wide and 9 inches long, the gauge air pressure was about 30 pounds per square inch, the drum 53 was approximately 4 inches in diameter and in one case, for example, contained about 237 holes per square inch on uniformly spaced centers affording an open area of approximately 21% with each hole being approximately 33 mils in diameter. The temperature of the air stream as it issued from the jet was approximately 370° C. At this temperature, the film 52 was fed through the apparatus at approximately 7 yards per minute, the space between the orifice and the grid roll being approximately ¼ inch (shown proportionately enlarged in FIG. 4). A cooling jet 60 was directed against the back surface of the drum 53 and was operated to maintain the surface of the drum preferably at approximately 55 to 70° C., well below the softening temperature of the film.

When perforating ¾ mil "Saran" film, the same drum, the same distance from drum to orifice and the same jet orifice were used as those described above in the case of Mylar polyester film, but the gauge air pressure was 13 pounds per square inch with the temperature of the air as it issued from the jet at approximately 235° C. The film in this instance was fed through the apparatus at approximately 1.7 yards per minute with the cooling jet maintaining the surface of the drum in the same range of temperatures as described above for the Mylar polyester film.

When perforating "Kel-F" film in 2 mil thickness, the orifice size was changed to 35 mils wide by 5 inches long, the distance from drum to orifice was reduced to ⅛ inch and a 4" diameter drum with holes approximately 250 mils in diameter and 8 holes per square inch was used. The gauge air presusre was 35 pounds per square inch, while the temperature of the air as it issued from the jet was approximately 425° C. The film in this instance was fed through the apparatus at approximately 2 yards per minute with the cooling jet maintaining the surface of the drum at approximately 105° C.

Similar treatment as above described in the case of "Mylar," "Saran" and "Kel-F" films can be given to perforate sheets of any of the hereinbefore mentioned polymeric materials.

FIGS. 4 to 8 are intended as graphic successive representations, in cross-section, of the development of the perforations in a typical thermoplastic sheet during the perforation treatment in the aforementioned apparatus.

At an early stage of melting of the sheet material in areas where it lies over grid perforations, there appears to be a thinning, with usually a rapid development of blistering in the thinned areas so that the sheet has a thinned and somewhat porous membrane 30 extending over each grid void as shown in FIG. 4.

FIGS. 5 through 8 inclusive, represent the successive effects of longer application of heat to the material overlying the grid voids. This series of figures shows, first the rupture of the material centrally followed by a progressive displacement of the material towards the unmelted areas surrounding the perforation, and taking in general the successive forms of bead-like borders, culminating in the bead 24 depicted in FIG. 8.

With respect to the relative tensile strength of ¼ mil Mylar polyester film before and after perforation in the apparatus using a grid having holes with a 20 mil diameter occurring approximately 700 per square inch, the loss in tensile strength of the Mylar polyester film is only about 18%. However, the stretch of such a film, as measured on an Instron Tensile Testing Instrument, increases from 100%, in the case of the plain Mylar polyester film, to 130%; and surprisingly enough, in ¼ mil Mylar polyester film it does so irrespective of whether the film has been treated on grids having 20 or 40 mil perforations. The loss in tensile strength is for many purposes further offset by the markedly improved tear resistance. As tested on an Elmendorf Tearing Tester (8 thicknesses) tear resistance increases from 6 grams on the original ¼ mil Mylar polyester film to 24 grams in the machine direction of the original sheet and increases from 8 grams to 44 grams in the transverse direction. It will thus be seen that the perforated material has increased utility in a variety of instances where tear resistance is of importance, for example, where sewing, pinning, stapling, or any other operation involving further piercing of the film is performed during its fabrication into composite articles.

Substantially crystalline sheet material as herein used is intended to include other sheet materials besides films, such as substantially crystalline fibers organized into sheetlike materials as by weaving, knitting, molding, carding, by paper-making methods, or otherwise. Likewise non-crystalline sheets which may be perforated by the process of this invention include in addition to films, thermoplastic sheets made by knitting, weaving, molding, carding, papermaking methods and other methods.

It is also understood that, products may be produced by a series of operations, wherein certain selected areas are treated to produce perforations in a first operation and intervening or other areas are similarly subsequently treated in a separate operation to impart further perforations.

As used in this application Mylar polyester film is defined as a product, sold by E. I. du Pont de Nemours and Company, Wilmington, Delaware under its trademark "Mylar," comprised essentially of substantially crystalline polyethylene terephthalate.

Similarly, in this application Saran film is defined as a product, sold by Dow Chemical Company, Midland, Michigan under its tradename "Saran A517," comprised essentially of substantially crystalline vinylidene chloride-vinyl chloride copolymers.

"Kel-F" film as used in this application is defined as a product made from basic material originally manufactured by M. W. Kellogg Company but now obtainable from Minnesota Mining and Manufacturing Company, St. Paul, Minnesota under its tradename "Kel-F" comprised essentially of monochlorotrifluoroethylene polymers.

This application is a continuation-in-part of my U.S. Patent No. 3,012,659 issued on December 12, 1961.

I claim:

1. An apparatus for perforating thermoplastic sheet material comprising a grid forming a supporting surface for said sheet, said grid having sheet-contacting surface areas and sheet non-contacting areas, cooling means for maintaining said sheet-contacting surface areas below the softening-point temperature of said sheet, orifice means positioned adjacent said grid for directing a jet of hot fluid against the surface of said sheet material while said sheet material is supported on said cooled sheet-contacting surface areas of said grid whereby portions of said sheet positioned over the sheet non-contacting areas of said grid are melted and perforation of said sheet occurs in the melted portions and means for moving said grid and sheet while said sheet is positioned on said grid past said hot fluid directing orifice means.

2. The apparatus of claim 1 wherein the grid is in the form of a rotatable drum.

3. The apparatus of claim 1 wherein the grid is perforated to create said sheet non-contacting areas.

References Cited in the file of this patent

UNITED STATES PATENTS

| | | |
|---|---|---|
| Re. 23,910 | Smith et al. | Dec. 14, 1954 |
| 2,314,826 | Kinkley | Mar. 23, 1943 |
| 2,513,838 | Beall | July 4, 1950 |
| 2,722,086 | Mullen | Nov. 1, 1955 |
| 2,776,451 | Chavannes | Jan. 8, 1957 |
| 2,776,452 | Chavannes | Jan. 8, 1957 |
| 2,814,077 | Moncrieff | Nov. 26, 1957 |